J. D. WILLOUGHBY
CIDER MILL.
No. 75,101.                               Patented Mar. 3, 1868.
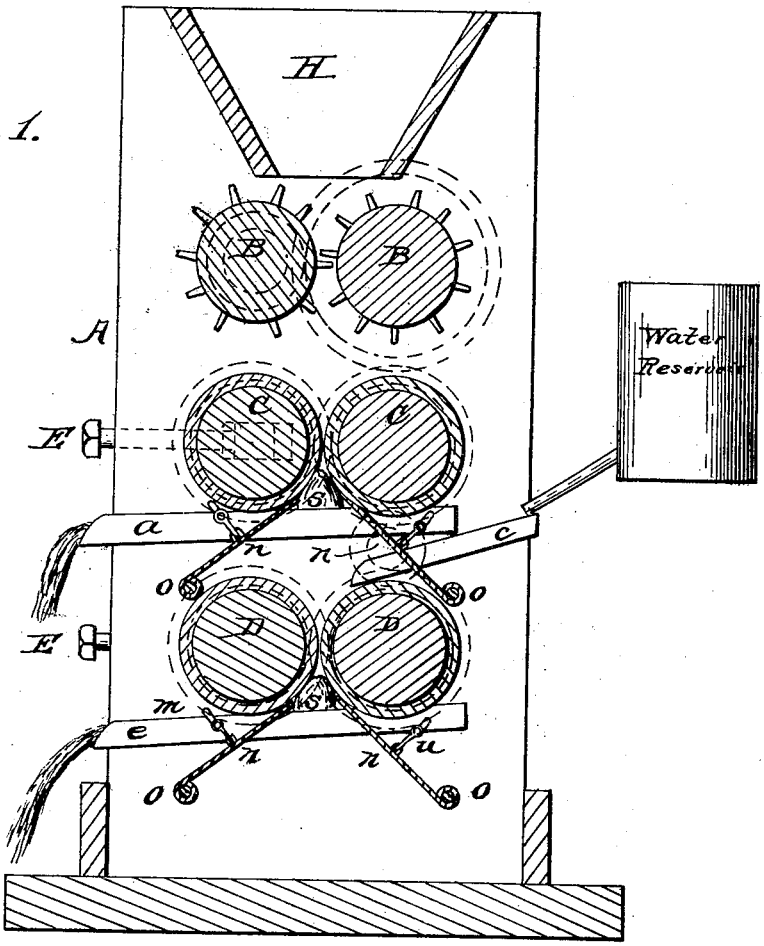
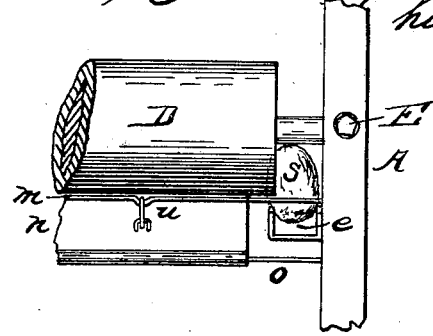

United States Patent Office.

J. D. WILLOUGHBY, OF SHIPPENSBURG, PENNSYLVANIA.

Letters Patent No. 75,101, dated March 3, 1868; antedated February 20, 1868.

---

IMPROVEMENT IN CIDER-MILLS.

---

The Schedule referred to in these Letters Patent and making part of the same.

---

TO ALL WHOM IT MAY CONCERN:

Be it known that I, J. D. WILLOUGHBY, of Shippensburg, in the county of Cumberland, and State of Pennsylvania, have invented certain new and useful Improvements in Mills for Extracting the Juice of Fruits; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in constructing a mill with grinding-rolls for crushing or grinding the fruit, and a series of elastic pressing-rolls for pressing out the juice, and so arranged that the operation of both grinding and pressing shall proceed simultaneously.

Figure 1 is a transverse vertical section.

Figure 2 is a front view of a portion.

A represents one end of the frame, which may be of any required size and form. In the upper portion of the frame is located a hopper, H, for receiving the fruit and feeding it to the grinding-rolls B, which may be of any suitable style. Immediately below the grinding-rolls I place two pressing-rolls, C, one of which should be mounted in adjustable bearings, (as indicated in dotted lines in fig. 1,) which is operated by a set-screw, E, for adjusting these rolls, so that they may be pressed together, and made to run tight against each other. These rolls C are made of wood or metal, and covered with rubber or similar elastic material, the object being to receive the pomace or crushed fruit as it falls from the grinding-rolls, and, while squeezing out the juice, which will run off at each end, be sufficiently elastic to permit the pomace or seeds to pass through between the rolls B, the pressing process being similar to that of the clothes-wringer. Under the ends of these rolls B are placed troughs a, to catch the juice and conduct it into the reservoir provided to receive it. In order to prevent the juice from adhering and running back on the under side of the rolls, I place a piece of sponge or other absorbing material at the ends of the rollers, as indicated by S, which rests in the spout a, and conducts the juice from the rolls thereto. If desired, the rolls may be so inclined as to cause the juice to flow off from the rolls all at one end. In order to prevent the pomace from adhering to the rollers and being carried around with them, I arrange scrapers n underneath the rollers, as shown in fig. 1. These scrapers n are pivoted at their lower edges, as indicated at o, and are connected by a link, u, to a spring-rod, m, which keeps their upper edges in contact with the surface of the rollers, as shown in fig. 2. By this means the pomace is scraped off from the rolls B, and drops down upon the rollers D, by which it is again pressed. Any number of rolls may be thus arranged to press it successively.

When it is desired to add water to the pomace after it has been pressed, for the purpose of producing a liquid for making vinegar, as is customary in cider-mills, a spout, e, may be arranged to convey the water to the upper side of the last pair of rolls, where it will saturate the pomace, and, when squeezed therefrom, will flow off at the ends into the spouts e, from which it will flow into the vessels placed to receive it, and thus the entire process may be performed at one operation.

It will be understood that the rolls will be so connected by gearing or otherwise, as to cause them to revolve in the proper direction, the gearing in this case being indicated by the red lines in fig. 1.

This machine is specially adapted for extracting the juice of grapes and berries, and, when used for this purpose, it may be desirable to substitute, for the grinding-rolls B, simple crushing-rolls, slightly roughened or ribbed on their surface.

I also find it desirable to make the surface of the pressing-rolls slightly rough, in order to cause them to more readily seize hold of the pomace, especially if the rolls be of small diameter. It is obvious that but one of the pressing-rolls in each pair needs to be covered with elastic material, and that, if desired, instead of placing the hopper and grinding-rolls over the pressing-rolls, they may be located elsewhere, and the ground material be conveyed to the pressing-rolls by an endless apron or belt.

Having thus described my invention, what I claim, is—

The arrangement of the grinding-rolls B relatively with one or more pairs of pressing-rolls, C D, and the spouts for receiving and conveying separately the various qualities of juice produced, substantially as shown and described.

J. D. WILLOUGHBY.

Witnesses:
W. C. DODGE,
H. B. MUNN.